No. 858,632. PATENTED JULY 2, 1907.
J. C. SLAUGHTER.
SYSTEM OF ELECTRICAL OPERATION.
APPLICATION FILED MAY 9, 1903.
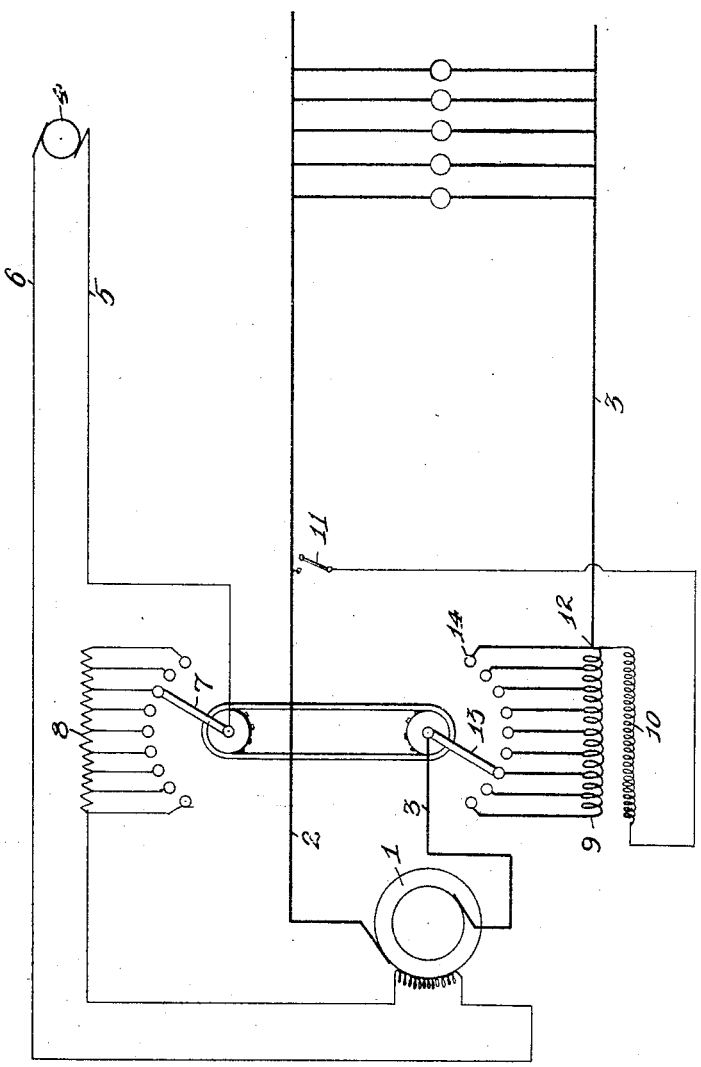
Witnesses
Alfred W Ericker
Edw. Harrington
Inventor
Joel C. Slaughter
by Higdon & Longan & Hopkins Attys

UNITED STATES PATENT OFFICE.

JOEL C. SLAUGHTER, OF DALLAS, TEXAS, ASSIGNOR TO ELECTRIC AUTO-TRANSFORMER COMPANY, OF ST. LOUIS, MISSOURI, A CORPORATION OF MISSOURI.

SYSTEM OF ELECTRICAL OPERATION.

No. 858,632.      Specification of Letters Patent.      Patented July 2, 1907.

Application filed May 9, 1903. Serial No. 156,361.

*To all whom it may concern:*

Be it known that I, JOEL C. SLAUGHTER, a citizen of the United States, residing at Dallas, Dallas county, State of Texas, have invented certain new and useful Improvements in Systems of Electrical Operation, of which the following is a specification containing a full, clear, and exact description, reference being had to the accompanying drawings, forming a part hereof.

The drawing is a diagrammatic view of an alternating current generator system showing my invention used in connection therewith.

This invention relates to systems of electrical operation and is adapted to be utilized particularly in connection with alternating currents.

The object of my invention is to provide a system wherein a saving will be effected in the power required to operate a generator during reduced loads, thereby reducing the fuel consumption below that which would be required to operate the systems in use at present. In the present systems, wherein a constant voltage is maintained, the magnetic losses in the generator when operating under a reduced load are practically the same as when it is supplying its entire capacity.

In my improved system I provide means for decreasing the excitation of the generator during reduced loads and thereby reduce the energy wasted through magnetic reactions. Decreasing the excitation will also reduce the voltage supply of said generator. To maintain the voltage at the desired value, I provide a suitable transformer in the generator circuit. I also provide means for varying the excitation of the generator and the strength of the transformer simultaneously.

Referring to the drawing which represents the preferred form of my invention, 1 indicates an alternating current generator, 2 and 3 the main lines leading from the same.

4 indicates the generator exciter, 5 and 6 indicate wires connecting the exciter 4 to the alternator field. When the wire 5 is connected to the positive brush of the exciter the current will pass from the exciter 4 through the wire 5, through the switch 7, into the rheostat 8, thence to the field of the alternator and return to the exciter through the wire 6.

9 indicates the primary coil of a transformer. This coil is of adjustable value and connected in series on the main line wire 3. 10 indicates the secondary coil which is preferably wound on the same core in close proximity to the primary, one end of this secondary coil is connected to the wire 3 at 12, the other end of said coil being connected to the wire 2 by means of a switch 11.

A switch 13 is connected at one end to the main line wire 3, the other end of said switch being adapted to engage any one of a series of contacts 14, connected to different points in the primary coil 9. I provide a connection between the switches 7 and 13 to cause them to operate simultaneously.

The operation of my improved system is as follows: When the generator is supplying its entire capacity the switch 7 engages the rheostat contact at the extreme left, thereby removing the resistance of the rheostat 8 from the exciter circuit, the switch 13 engages the contact 14 at the extreme right, thus permitting the entire generator supply to be delivered to the translating devices without going through the adjustable primary coil 9, and if desired the switch 11 may be open. When the generator is operating under reduced loads, the switch 11 is closed. The switches 7 and 13 are adjusted simultaneously to decrease the field excitation and maintain a predetermined voltage in the generator circuit, *i. e.* the switch 7 is adjusted to introduce a certain amount of resistance into the exciter circuit, thereby reducing the excitation of the generator, hence reducing its magnetic losses. The generator will now supply a reduced voltage but it will be understood that the switch 13 moved in unison with the switch 7 and placed a portion of the primary coil into the generator circuit, thereby increasing the voltage supplied by said generator.

I am aware that minor changes in the construction, arrangement and combination of the several parts of my system can be made and substituted for those herein shown and described without in the least departing from the nature and principle of my invention.

I claim:

1. In a system of electrical operation, means for varying the field strength of an alternating current generator, adapted to decrease the energy wasted by said generator during reduced loads, co-operating with means for maintaining a predetermined voltage on a circuit supplied by the generator; substantially as described.

2. In a system of electrical operation, means for varying the field strength of an alternating current generator, co-operating with a transformer located in circuit with the generator, to increase the efficiency of said generator during reduced loads; substantially as described.

3. In a system of electrical operation of the character described, a series of coils so arranged as to be brought into play and maintain the line voltage at any desired constant figure, while the generator voltage can be lowered so as to permit operation at better economy, and means for disconnecting the coils and allowing the generator to feed directly into the line when the load becomes such that the use of the coils no longer effects said economy, substantially as specified.

4. In a system of electrical operation of the character described, a generator, a series of coils so constituted as to effect a variable voltage-raising or lowering apparatus which keeps the line voltage constant at any desired figure and permits the generator to be operated at the voltage giving the greatest economy, and means for disconnecting said voltage-raising or lowering device at such times as when it becomes inexpedient to use the same, substantially as specified.

5. In a system of electrical operation, means for reducing the field strength of an alternating current generator during low loads, co-operating with means for increasing the voltage supplied by said generator, for the purpose specified.

6. In a system of electrical operation, means for varying the field strength of an alternating current generator adapted to operate in unison with means for maintaining a predetermined voltage supply, substantially as described.

7. In a system of electrical operation, an alternating current generator, a transformer located in a circuit supplied by said generator, and means for simultaneously varying the field strength of the generator and the strength of said transformer, substantially as described.

8. In a system of electrical operation, an alternating current generator, a voltage raising device located in a circuit supplied by said generator, and means for simultaneously varying the field strength of the generator and the strength of said voltage raising device, substantially as described.

9. In a system of electrical operation, an alternating current generator, a transformer having a primary coil of adjustable value located in a circuit supplied by said generator, and means for simultaneously varying the strength of the generator field and the strength of said primary coil, for the purpose specified.

10. In a system of electrical operation, an alternating current generator, a transformer having its primary coil connected in series on a circuit supplied by said generator, and its secondary connected in multiple on said circuit, and means for varying the strength of the generator field adapted to operate in unison with means for varying the strength of said primary coil, substantially as described.

11. In a system of electrical operation, an alternating current generator, means for simultaneously decreasing the generator excitation and increasing the voltage supplied by said generator, substantially as described.

12. In a system of electrical operation, a voltage raising device arranged to raise the voltage supplied by a generator during reduced loads and thereby allow the field excitation to be reduced so as to permit operation at greater economy, and means for disconnecting the voltage raising device and allowing the generator to feed directly into the line when the use of said device does not effect an economy, substantially as described.

13. In a system of electrical operation, a transformer arranged to raise the voltage supplied by a generator during reduced loads and thereby allow the field excitation to be reduced so as to permit operation at greater economy, and means for disconnecting the transformer and allowing the generator to feed directly into the line when the use of said transformer does not effect an economy, substantially as described.

14. In a system of electrical operation, a voltage raising device co-operating with a device for varying the field excitation of an alternating generator to enable said generator to operate economically during reduced loads, and means for eliminating said devices when they do not effect an economy, substantially as described.

In testimony whereof, I have signed my name to this specification, in presence of two subscribing witnesses.

JOEL C. SLAUGHTER.

Witnesses:
M. G. IRION,
ALFRED A. EICKS.